United States Patent

[11] 3,629,507

[72] Inventor John L. Worrall
Prairie View, Ill.
[21] Appl. No. 876,323
[22] Filed Nov. 13, 1969
[45] Patented Dec. 21, 1971
[73] Assignee SCM Corporation
New York, N.Y.

[54] SOLID-STATE LINE KEYER
11 Claims, 1 Drawing Fig.

[52] U.S. Cl. .......... 178/79, 178/74
[51] Int. Cl. .......... H04l 15/04
[50] Field of Search .......... 178/17, 74, 79

[56] References Cited
UNITED STATES PATENTS
2,585,079 2/1952 Beaufoy .......... 178/79
3,449,517 6/1969 Turja .......... 178/79

*Primary Examiner*—Kathleen H. Claffy
*Assistant Examiner*—William A. Helvestine
*Attorney*—Mason, Kolehmainen, Rathburn and Wyss

ABSTRACT: A solid-state line keyer used in a telegraph system isolates an input signal from a signal line. The keyer includes an oscillator responsive to the input signal to which is inductively coupled by means of an adjustable transformer a control transistor whose output controls a Darlington circuit connected in series with and energized by the signaling line. The Darlington circuit provides a low-impedance loop during a normal mark condition and the control transistor provides a high-impedance loop when an input signal is impressed on the keyer to indicate a space condition.

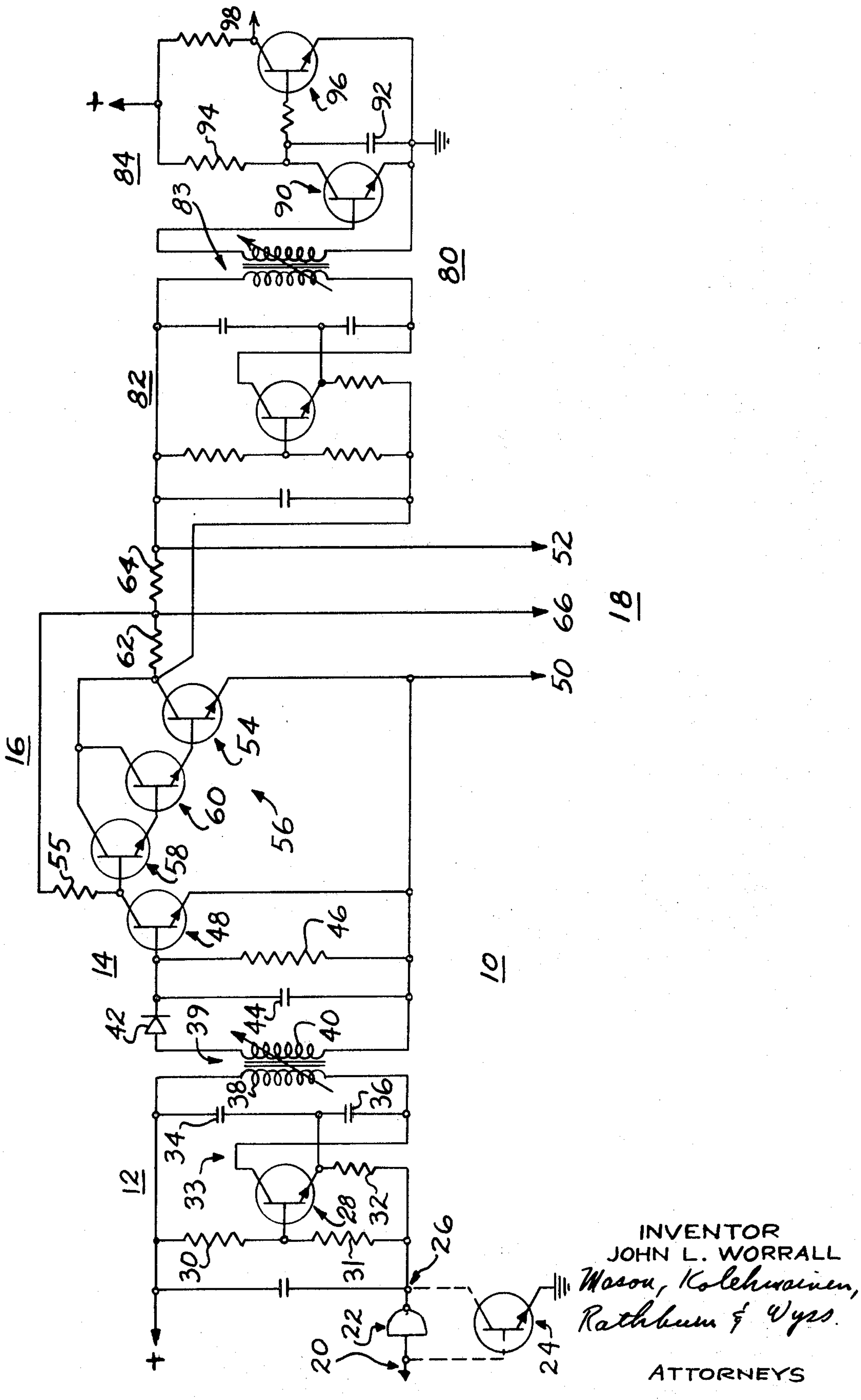
INVENTOR
JOHN L. WORRALL
Mason, Kolehmainen, Rathburn & Wyss.
ATTORNEYS

SOLID-STATE LINE KEYER

This invention relates to a solid-state line keyer, and, more particularly, to an improved line keyer that isolates an input signal from a signal line in a telegraph system.

In telegraph systems, a signaling line having a regulated potential from a central office commonly connects a group of telegraph stations in a signaling loop. At each station, a low impedance is maintained in series with the signal line during a mark condition so that the line has a regulated amount of normal current flow representing an idle or mark condition. When a station is desirous of establishing a space condition on the line, the station places a high impedance in series with or opens the signaling line so that the current level on the signal line is sharply reduced.

In the past, relay-controlled contacts have been used to control the signaling line, but these electromechanical devices frequently lack the speed of response desirable in modern systems and require maintenance. Attempts to use controlled conduction devices to control the line have, in many instances, been ineffective because of inadequate isolation of the input signal source from the line.

Accordingly, one object of the present invention is to provide a new and improved solid-state line keyer.

Another object is to provide a new and improved line keyer that isolates the input signal for a telegraph system while maintaining the required high speed and improved reliability.

In accordance with these and many other objects, an embodiment of the present invention comprises a line keyer having a normally inoperative oscillator inductively coupled through an adjustable transformer to the input of a control transistor whose output controls the conductivity of a Darlington circuit connected in series with and energized by the signaling line or loop. During a normal mark condition, the control transistor is controlled by the potential on the signal line to hold the Darlington circuit in a conductive state so that a low-impedance path is maintained in series relation with the signal line. When a space is to be transmitted, the input signal places the oscillator in oscillation, and its output is detected and applied to the control transistor to place the Darlington circuit in a nonconductive or high-impedance state so that a high-impedance path is established in series relation with the signal line through the control transistor. The inductive coupling of the oscillator to the control transistor isolates the input signal from the signal line. However, the keyer has the proper reliability and high speed required by modern telegraph systems.

Many other objects and advantages of the present invention will become apparent from considering the following detailed description in conjunction with the drawing which is a schematic diagram of a line keyer embodying the present invention shown in combination with a signal receiver that has been previously used in telegraph systems.

Referring now more specifically to the drawing, therein is illustrated a solid-state line keyer which is indicated generally as 10 and which embodies the present invention. The line keyer 10 includes an oscillator 12 which is inductively coupled to a detecting or rectifying circuit 14 that provides a signal to place one of a pair of alternate impedance paths in an impedance network 16 in a series relation with a signal line 18. When an input signal is impressed on a terminal 20, a gate 22 or a transistor 24 is rendered conductive establishing a ground potential at a node or terminal 26 so that the oscillator 12 is placed into oscillation and a space condition is established on the signal line 18.

The oscillator 12 is a typical solid-state Colpitts oscillator consisting of a transistor 28 biased by resistors 30, 31, and 32 and a tank circuit 33 including two capacitors 34 and 36 and a primary winding 38 of an adjustable transformer 39. The output of the oscillator 12 appearing on the winding 38 is inductively coupled through a secondary winding 40 of the transformer 39 and a diode 42 to charge a capacitor 44 shunted by a resistor 46. The capacitor 44 applies a positive potential, the amplitude of which is controlled by the adjustable transformer 39, to the base of an NPN-control transistor 48 and renders the transistor 48 conductive. By using the input space signal to trigger the oscillator 12 and by inductively coupling the oscillator output through the detecting network 14 to the control transistor 48, the input signal impressed on the terminal 20 is virtually completely isolated from the signal line 18.

During a normal mark condition, the signal line 18 is carrying a potential supplied by a central office with a terminal 50 relatively negative as compared to a terminal 52 so that a transistor 54 is biased into a conductive state. More specifically, with the transistor 48 in its normally nonconductive state, a resistance element 55 applies a more positive bias to the base of a transistor 58 in a Darlington circuit 56 to place this transistor and a transistor 60 in a conductive state to saturate the transistor 54. With the transistor 54 conductive, two relatively low valued resistors 62 and 64 are maintained in a series relation with the signal line 18. As the transistor 48 is rendered conductive, the base of the transistor 58 at the input to the Darlington circuit 56 is driven more negative, and the transistor 54 is rendered nonconductive to place the resistance element 64 and the relatively high-impedance resistor 55 in series with the signal line 18 through the conductive transistor 48.

Thus, when there is no space input signal at the terminal 20, the transistor 54 is conductive, and the relatively low-impedance resistors 62 and 64 are in series with the signal line 18 so that the normal mark or high-current condition is maintained on the signal line 18. When a space input signal is impressed on the terminal 20, a ground reference is established at the terminal 26 placing the oscillator 12 in an oscillating condition and causing the transistor 48 to become conductive by means of the forward bias supplied through the rectifying network 14. The high-impedance resistor 55 is thus placed in series with the signal line 18, and the transistors 54, 58 and 60 are rendered nonconductive.

The transistors 28, 48, 58, 60 and 54 can all be of the NPN-type as described, or can be PNP-transistors if the reference potentials and the diode 42 are reversed.

If the power supply at a station where the keyer 10 is located becomes inoperative, the keyer 10 does not allow a false space condition to occur on the signal line 18 because the transistor 54 is maintained conductive by the potential on the signal line 18 as previously discussed. This maintains the low-impedance resistance elements 62 and 64 in series with the signal line 18, and the integrity of the system is maintained even though power outages occur at individual stations.

The desired current level on the signal line 18 is adjusted by the resistor 64 which is in series with the signal line 18. If high-current operation is desired, the terminal 52 can be connected or jumped to a terminal 66, and the level of current is increased during a mark condition.

Normally a line receiver, such as a unit 80 used in the prior art, is coupled to the signal line 18 at each station. The receiver 80 includes an oscillator 82 and an output circuit 84 coupled to the oscillator 82. When a normal mark condition is present on the signal line 18, the transistor 54 is conductive, as previously described, and the potential drop across the resistance elements 62 and 64 supplies an operating potential to the oscillator 82. Thus, this oscillator is normally in an oscillatory state. The output of the oscillator 82 is inductively coupled through an adjustable transformer 83 to the output circuit 84 so that a transistor 90 is normally rendered conductive.

When a space condition is applied to the signal line 18, the potential drop across the resistance elements 62 and 64 due to the reduced current flow over the line 18 is not sufficient to operate the oscillator 82, and the transistor 90 becomes nonconductive. This permits a capacitor 92 to charge in a positive direction through a resistance element 94 so that a transistor 96 is placed in a conductive condition to provide a more negative output at a terminal 98 representing the space input signal. When the line 18 returns to a marking condition, the oscillator 82 returns the transistor 90 to a conductive condition to place the transistor 96 in a nonconductive state. This drives the terminal 98 more positive representing the mark condition on the line.

What is claimed and desired to be secured by Letters Patent of the United States is:

1. A solid-state line keyer for a signaling system to isolate input signals from a signal line, said keyer comprising
an oscillator operated between oscillatory and quiescent states in response to said input signals,
a controlled conduction means connected in series relation with the signal line and operable to two different states to insert a relatively high and a relatively low impedance in series relation with the signal line, and
inductive means coupling the oscillator to and controlling the state of the controlled conductive means thereby to control the impedance inserted in the signal line.

2. The line keyer set forth in claim 1 in which
a first controlled conduction device couples the inductive means to the controlled conduction means, said first device being selectively rendered conductive and nonconductive under the control of the change in the states of the oscillator, and
the controlled conduction means includes a second controlled conduction device operable between a relatively high and a relatively low impedance state in response to the change of state of the first controlled conduction device.

3. The line keyer set forth in claim 2 in which the controlled conduction means includes
an impedance element connected in a series relation with the signal line through the second conduction device in its relatively low impedance state.

4. The line keyer set forth in claim 2 in which the controlled conduction means includes
a circuit having cascaded additional controlled conduction devices coupling the first device to the second device so that changes in the state of the first device change the second device between its two different states thereby to control the impedance inserted in the signal line.

5. A solid-state line keyer for a signaling system to isolate an input signal from a signal line having a relatively low impedance in a normal mark condition and a relatively high impedance for a space condition, said keyer comprising
an oscillator placed in operation in response to a space input signal,
a controlled conduction means coupled to the line and normally in a conductive state for maintaining a relatively low impedance path in series relation with the signal line during a normal mark condition, and
inductive means coupling the oscillator to the controlled conduction means for controlling the controlled conduction means so that a relatively high impedance path is established in series relation with the signal line in response to the space input signal.

6. The line keyer set forth in claim 5 in which the controlled conduction means include
a relatively low resistance element,
a normally conductive first controlled conduction device connecting the relatively low resistance element in a series relation with the signal line through the first controlled conduction device, and
a circuit having cascaded additional controlled conduction devices coupled to the first device for maintaining the first controlled conduction device in its normally conductive state.

7. A line keyer set forth in claim 5 including
a relatively high impedance resistance element, and
a second controlled conduction device coupling the inductive means to the controlled conduction means to render the controlled conduction means nonconductive under the control of the oscillator, said second device also placing the relatively high impedance resistance element in series relation with the signal line when the controlled conduction means is rendered nonconductive.

8. A solid-state keyer responsive to an input signal for a signaling line carrying a potential comprising
a first network including at least a first controlled conduction device and a relatively low impedance means, said first network connected in series relation with the line and energized by the potential on the line,
circuit means coupling the line to the first controlled conduction device to normally maintain the first device in a conductive state to place the relatively low impedance means in series relation with the line,
a second network including a second controlled conduction device and a relatively high impedance element, said second network connected in series relation with the line, energized by the potential on the line, and coupled to said first network,
a source of input signals, and
a control circuit controlled by the input signals and coupled to the second controlled conduction device for placing said second device in a conductive state to place the relatively high impedance element in series relation with the line and to inhibit conduction through the first device.

9. The keyer set forth in claim 8 in which the circuit means include
said relatively high impedance element, and
a circuit having cascaded additional conduction devices coupling the first device to the second device to inhibit conduction through the first device in response to the output of the second device.

10. The keyer set forth in claim 8 in which the control circuit includes
a biasing means coupled to the second device for controlling the conductivity of the second controlled conduction device, and
an oscillator responsive to the input signal and inductively coupled to the biasing means.

11. A sender-receiver device for a signaling system to isolate input and output signals from a signal line, said device comprising
a first oscillator operated between oscillatory and quiescent states in response to said input signals,
an impedance element,
a first controlled conduction means connected in series relation with the signal line and the impedance element and operable to two different states to change the current on the signal line between two corresponding levels,
inductive means coupling the first oscillator to and controlling the state of the first controlled conduction means thereby to control the impedance of the signal line,
a second oscillator coupled to the impedance element and operated between oscillatory and quiescent states in response to the potential drop across said impedance element,
a second controlled conduction means operable between a relatively high and a relatively low impedance state to provide said output signal, and
inductive means coupling the second oscillator to the second controlled conduction means and controlling the state of the second controlled conduction means thereby to control the output signal.

* * * * *